United States Patent [19]

Stawski

[11] Patent Number: 4,789,594

[45] Date of Patent: Dec. 6, 1988

[54] METHOD OF FORMING COMPOSITE RADIUS FILLERS

[75] Inventor: Stanley W. Stawski, Pierce, Wash.

[73] Assignee: The Boeing Company, Seattle, Wash.

[21] Appl. No.: 39,003

[22] Filed: Apr. 15, 1987

[51] Int. Cl.⁴ .............................................. B32B 1/04
[52] U.S. Cl. .................................... 428/397; 156/222; 156/264; 156/269; 264/241; 428/902
[58] Field of Search ................. 83/436, 707, 718, 722; 156/222, 250, 269, 264; 244/123; 264/241; 428/397, 902

[56] References Cited

U.S. PATENT DOCUMENTS

| | | |
|---|---|---|
| 300,099 | 6/1884 | McClosky . |
| 305,709 | 9/1884 | Parry . |
| 1,473,642 | 11/1923 | Reichel . |
| 1,611,781 | 12/1926 | Russell . |
| 3,995,080 | 11/1976 | Cogburn . |
| 4,109,435 | 8/1978 | Loyd . |
| 4,151,031 | 4/1979 | Goad . |
| 4,177,306 | 12/1979 | Schulz . |
| 4,210,184 | 7/1980 | McGriff ........................ 83/436 X |
| 4,219,980 | 9/1980 | Loyd . |
| 4,331,723 | 5/1982 | Hamm . |
| 4,394,409 | 7/1983 | Hertel . |

Primary Examiner—Robert A. Dawson
Attorney, Agent, or Firm—Seed and Berry

[57] ABSTRACT

A laminated board is built up from a plurality of layers of composite material having substantially unidirectional fibers. The layers are arranged so that all of the fibers in the board are substantially parallel to the length of the board. The board is cut at alternate 60° angles with respect to a bottom layer of the board in the direction of the fibers to form a plurality of strips having a substantially triangular cross section. The strips are then advanced through a rolling machine which forms radiused surfaces on two adjacent sides of an equilateral triangle which is described by the cross section of the strip. Tapered fillers are formed by varying the thickness of the board from one end to the other. A strip-cutting machine having an angled blade, guides for the board, and a mechanism for translating the blade with respect to the board is also disclosed.

15 Claims, 3 Drawing Sheets

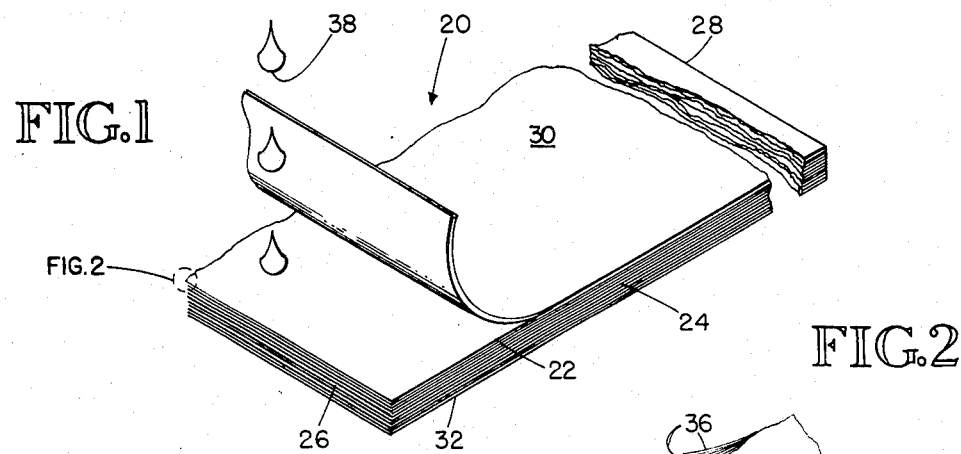
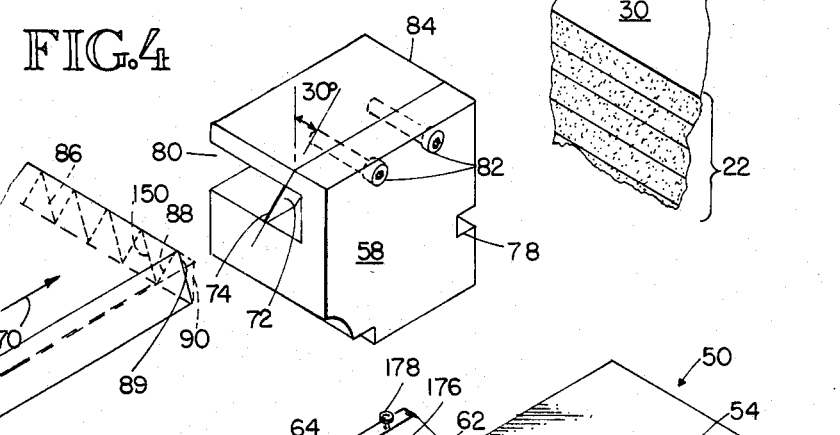
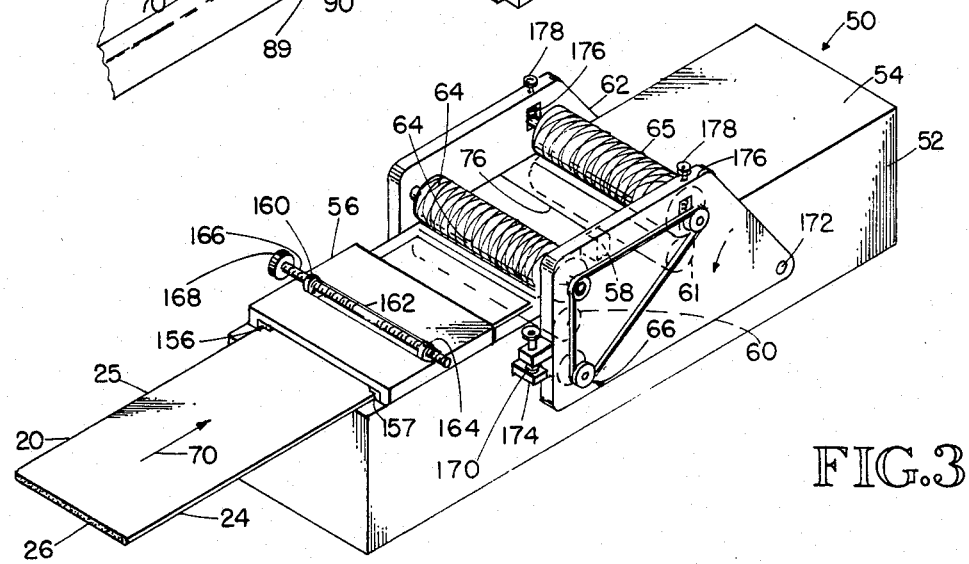

METHOD OF FORMING COMPOSITE RADIUS FILLERS

STATEMENT OF GOVERNMENT INTEREST

The government has certain rights in this invention.

TECHNICAL FIELD

The invention relates to radius fillers for composite structures. More specifically, the invention relates to methods and apparatus for forming radius fillers for use in junctions between sections of composite structures.

BACKGROUND ART

Composite structures made from fibrous materials, such as Fiberglas ®, graphite fibers and various resins, such as epoxy, are finding increased use as substitutes for metal in aircraft and other structures. It is well known that composite structural elements can be specifically designed for various structural purposes by selecting the appropriate filament direction and laminate structure of the composite.

The use of composites in structural members such as I-beams and flanges has presented a particular problem. It is known that the junction between two perpendicular composite layers is prone to peeling. U.S. Pat. No. 3,995,080, issued to Cogburn et al., describes the use of fillers (fillets) which are radiused to conform to the junction between perpendicular composite structures, such as the web and flange sections of an I-beam.

In U.S. Pat. No. 4,331,723 issued to Hamm and assigned to the assignee of the present invention, the use of composite fillers is described in conjunction with additional reinforcing structure.

Fillers of the type described above are generally triangular in cross section. Two adjacent sides of the filler are radiused to conform to curvature at the junction of the perpendicular composite structures.

Formation of the fillers is a tedious, laborintensive, and expensive procedure. The conventional method for forming fillers includes a series of manual steps. In the first step, a section of composite material which has been pre-impregnated with resin is folded or rolled to form a roughly rectangular or cylindrical shape. Where the filler is designed for use in an elongated structural member such as an I-beam, the filler must be provided with a length equal to the structural member; the filler may be a few inches long, five feet long, six feet long, or longer. The pre-impregnated composite tape is difficult to handle because it is generally tacky at room temperature. It is very difficult to fold this material into a rectangular or triangular cross section having a width of approximately ¼" because of the tackiness. Furthermore, substantial nonuniformity in the folded material is unavoidable.

After the composite material has been rolled or folded into an elongated shape, the material is roll-formed in a second step by a conventional roll-forming machine to produce the desired triangular cross section with radii on two adjacent sides. Nonuniformities in the folded material can jam the roll-forming machine.

Therefore, a need exists for a simplified, economical method of forming radius fillers for composite structures.

DISCLOSURE OF THE INVENTION

It is an object of the present invention to provide a method for forming composite radius fillers having uniform dimensions.

It is also an object of the present invention to provide a method for forming composite radius fillers efficiently and inexpensively.

It is yet another object of the present invention to provide a method for forming tapered radius fillers.

It is still another object of the present invention to provide an apparatus for forming composite structure radius fillers.

The invention achieves these objects, and other objects and advantages which will become apparent from the description which follows, by providing a method for forming composite radius fillers having a substantially parallel fiber direction. In a first step, an elongated board is constructed from a plurality of layers of composite material. Each layer has a plurality of elongated fibers which are aligned substantially parallel to one another and to the length of the board. In a second step, elongated strips are separated from the board in the fiber direction. The strips are easily separated from the board because the fibers are substantially parallel to one another and to the length of the board. The strips are separated from the board so that each strip has an intermediate cross-sectional shape which approximates the ultimate desired cross-sectional shape of the radius filler. In a third step, the elongated strips are then formed in a forming device to achieve the desired cross-sectional shape. It is also possible to use the elongated strips as radius fillers without forming the elongated strips in the third step.

In the preferred embodiment, the elongated strips are separated from the board during cutting steps. The strips are cut at an acute angle with respect to a bottom layer of the board. Between each cutting step, the board is rotated about a transverse axis end-for-end and the cutting blade is translated a predetermined distance so that the resulting strips have an intermediate cross-sectional shape which approximates an equilateral triangle. The strips may then advance through a conventional roll forming machine to achieve the desired radius shape on two adjacent sides of each strip.

Tapered radius fillers are prepared by laying up a composite board having layers of varying lengths. The layers are positioned so that the board has a tapered thickness between the ends thereof. In this way, every other strip separated from the board has a correspondingly tapered, triangular cross section.

An apparatus for forming the composite radius fillers of the present invention is also disclosed. The apparatus has an elongated table which has a table surface for supporting the board. A cutting blade is disposed on the table surface at an acute angle thereto. The blade slides transversely with respect to the table surface. Guides are provided to guide the board toward the blade in a direction parallel to the fiber direction of the board. Prior to cutting each filler from the board, the blade is translated and the board is rotated about a transverse axis end-for-end so that the resulting fillers have an equilateral, triangular cross section. A drive mechanism can be provided to automatically drive the board through the cutting blade.

BRIEF DESCRIPTION OF THE DRAWINGS

FIG. 1 is a partial isometric view of a laminated board in accordance with the present invention.

FIG. 2 is an enlarged, partial isometric view of a section of the board indicated by the circled area in FIG. 1.

FIG. 3 is an isometric view of a strip-cutting machine in accordance with the present invention.

FIG. 4 is an enlarged isometric view of a blade carriage used in the apparatus shown in FIG. 3, and a schematic representation of cuts made by the blade in the composite board.

BEST MODE FOR CARRYING OUT THE INVENTION

Figure 5:
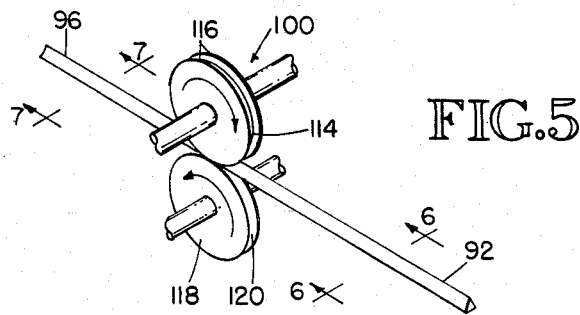
FIG. 5 is a schematic representation of a conventional roll-forming machine.

A composite board for the production of tapered fillers in accordance with the present invention is generally indicated at reference numeral 20 in FIG. 1. The board is made up from a plurality of layers 22 of composite material. The board has a right side 24, an opposite left side 25 (see FIG. 3), a first end 26, a second end 28, a top layer 30, and a bottom layer 32. The board is generally rectangular.

As best seen in FIG. 2, each of the layers 22 consists of a plurality of substantially unidirectional fibers 36. The layers are pre-impregnated with a resin or other binding material, as generally represented by droplets 38.

In this preferred embodiment, the layers 22 are sections of resin-pre-impregnated composite tape which are layered and pressed to form the composite board 20. The tape has a width of approximately 3", 6" or 12" and a thickness of approximately 0.007" to 0.009". The tape is generally supplied with a backing (not shown) which is removed before the layers are applied to one another. The resin is generally tacky or sticky at room temperature; thus the layers adhere to one another so as to form the board. It is important that the layers be assembled so that the unidirectional fibers 36 of each layer are substantially parallel to one another and parallel to the left and right sides of the board 30. This provides a composite board 20 which can easily be split by a force applied in a direction parallel to the fiber direction.

A strip-cutting machine which cuts strips from the composite board 20 is generally indicated at reference numeral 50 in FIG. 3. The machine has a frame 52 which supports a table surface 54. The machine also has a guide mechanism 56, a blade carriage 58, a pair of idler rollers 60, 61, and a drive suspension 62. The drive suspension 62 has drive rollers 64, 65 and a drive system generally indicated at reference numeral 66. The drive rollers 64, 65 are knurled or otherwise provided with a surface having a high coefficient of friction.

The guide mechanism 56 is connected to the table surface 54 and serves to direct the board 20 in a cutting direction 70 which is parallel to the orientation of the unidirectional fibers 36.

The blade carriage 58 supports a blade 72 having a cutting edge 74. The blade is preferably thin. A conventional utility knife blade is suitable for this purpose. The blade carriage is slidably engaged with a track 76 on the table surface 54 so that the cutting edge 74 is translatable with respect to the board 20 in a direction which is transverse to the orientation of the unidirectional fibers 36. The track 76 engages a track slot 78 in the blade carriage. The carriage has an aperture 80 sufficient to accept the board 20 therein.

The blade is disposed at a 60° angle with respect to the table surface. Setscrews 82 threadedly engage a blade-retaining block 84 to secure the blade 72 within the blade carriage 58. The blade edge 74 separates the board 20 into elongated strips having triangular cross-sections, as indicated by dotted lines 86 in FIG. 4. The plane of the blade 72 is substantially parallel to the orientation of the unidirectional fibers 36. Therefore, individual fillers are easily separated from the board by the blade. It is important that the board be separated into individual strips and then formed into fillers before the board is cured. The strips are easily separated from the board as long as the board is uncured.

Figure 6:
FIG. 6 is an enlarged sectional view taken along line 6—6 of FIG. 5.

The following method is used to separate individual fillers from the board. The board 20 is inserted into the guide mechanism 56 as shown in FIG. 3. The board is manually advanced until the second end 28 of the board 20 is grasped between the drive roller 64 and idler roller 60. The drive system 66 advances the board to the blade carriage 58. The blade carriage is positioned in a right-hand position, as shown in FIG. 3. The first cut made by the blade is indicated by dotted line 88 (note that an initial cut 89 to remove a waste piece 90 has been completed). The board 20 is advanced through the blade 72 and is grasped by the drive roller 65 and idler roller 61. After the first end 26 of the board has passed through the drive roller 64 and idler roller 60, the drive roller 65 and idler roller 61 pull the remainder of the board through the blade. Completion of the cut indicated by dotted line 88 produces an elongated strip 92 (see FIG. 5) which has an intermediate cross-sectional shape 94, shown in FIG. 6.

Figure 7:
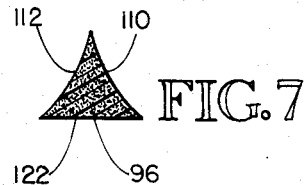
FIG. 7 is an enlarged sectional view taken along line 7—7 of FIG. 5.

To achieve the desired cross-sectional shape 96 shown in FIG. 7, the strip 92 can be formed by a conventional roll-forming machine, schematically illustrated at reference numeral 100. A suitable roll-forming machine is described in U.S. Pat. No. 4,559,005, issued to Gants et al. The strip 92 is readily formed into the shape 96, having two radiused adjacent sides 110, 112, by an upper roller 114 which has correspondingly radiused surfaces 116. A lower roller 118 has a flat circumferential surface 120 to supply a reaction force against the bottom 122 of the strip 92. It has been found that the uniform shape of elongated strips 92 produced by the method described above substantially reduces jamming in the roll-forming machine 100 over conventional prior art techniques. In certain applications, the elongated strips may be used as fillers without being formed in the roll-forming machine.

Figure 8:
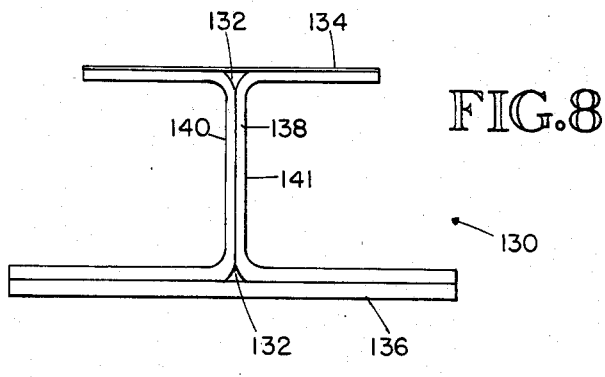
FIG. 8 is a schematic representation of a composite I-beam illustrating the position of composite radius fillers produced by the method and apparatus of the present invention.

FIG. 8 illustrates a composite I-beam, generally indicated at reference numeral 130, which utilizes composite radius fillers 132 of the present invention. The beam has an upper flange 134 which is connected to a substantially parallel lower flange 136 by a perpendicular web 138. The web 138 includes two adjacent sections 140, 141 which are laminated to the upper and lower flanges 134, 136. The radiused fillers 132 fill a void which would otherwise occur at the junction of these parts and lend substantially increased peel resistance to the structure. The flanges, adjacent web sections, and fillers are simultaneously cured to form a unitary structure. The fillers 132 can also be used at the junction of plies on "T" sections, flanges, and other composite structures.

In order to form each subsequent elongated strip from the board 20, the blade carriage 58 is translated to the left a predetermined distance equal to one-half the desired width of the filler 132. The board 20 is then rotated about an axis transverse to the orientation of the unidirectional fibers 36 end-for-end so that the end 28 of the board is adjacent to the drive roll 64 and idler roll 60. As is described below, the guide mechanism 56 is adjusted to re-center the board 20 on the table surface 54. Advancing board in the cutting direction 70 will therefore produce a cut indicated by dotted line 150. After this second elongated strip is completely separated from the board 20, the board is again rotated end-for-end and advanced through the strip-cutting machine 50 to produce the next elongated strip.

To maintain the board 20 in a centered position on the table 54, the guide mechanism 56 is provided with movable guides 156, 157. The guides can be constructed from any suitable low-friction material or can be provided with a low-friction coating, such as Teflon ® brand coating. The guide 156 has a threaded flange 160 which protrudes from a slot 162 in the guide mechanism 156. The guide 157 is provided with a threaded flange 164 which also protrudes through the slot 162. The flanges 160, 164 are counter-threaded so that a threaded shaft 166 which has correspondingly counter-threaded left- and right-hand halves causes the guides to move apart or move together upon rotation of a knob 168. As previously described, the knob 168 is adjusted after each elongated strip 92 is removed from the board 20 to maintain the central position of the board with respect to the table 54.

Inserts (not shown) may be provided which are retained in the guides to closely receive the sides of the board 20. Note that before the first waste piece 89 is removed, the sides 24, 25 of the board are substantially perpendicular to the table 54. If the guides 156, 157 are provided with vertical interior surfaces which are perpendicular to the table 54, the guides 156, 157 will adequately receive the board 20. However, after the first waste piece 89 is removed, the right side 24 of the board will form a 60° angle with the table surface 54. Therefore, it is preferred that an insert be provided for the guide 157 which has a correspondingly angled surface. The insert may be provided with an end flange which overlies a portion of the guide 157 to prevent the insert from sliding in the cutting direction 70 with the board 20.

The drive suspension 62 of the strip-cutting machine 50 is provided with a spring-biasing mechanism 170 which pivots the drive suspension 62 about a drive system axle 172. Rotation of a knob 174 applies spring compression to squeeze the board 20 between the drive roller 64 and idler roller 60. The driver roller 65 is provided with a separate, independent spring-bias mechanism 176 which squeezes the board 20 between the drive roller 65 and idler roller 61. Adjustment of the separate spring-bias mechanism 176 is achieved by rotation of control knobs 178.

Figure 11:
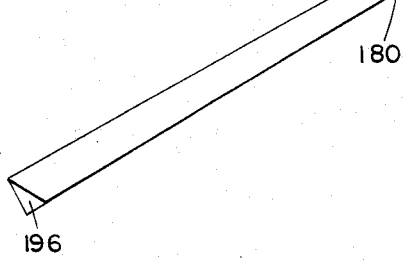
FIG. 11 is an enlarged isometric view of a tapered strip produced from the board shown in FIG. 9.
Figure 12:
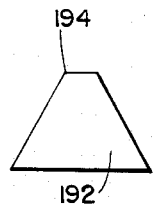
FIG. 12 is a sectional view taken along line 12—12 of FIG. 10 of the waste strip.

The strip-cutting machine 50 is also suitable for forming tapered elongated strips 180, as shown in FIG. 11. A modified composite board, generally indicated at reference numeral 182, is advanced through the machine to produce the tapered elongated strips. The modified composite board 182 tapers in thickness from a first end 184 to a second end 186. The method of constructing the board 182 is similar to the method of constructing composite board 20, except that individual layers 188 are formed from sections of composite tape have different lengths. Individual layers are arranged so that each layer has one end at the first end 184 of the board 182 and the other end at regularly spaced intervals toward the second end 186 of the board. As an example, the thickness of the board at the first end could be $\frac{1}{8}$", whereas the thickness of the board at the second end could be $\frac{1}{4}$", with a smooth taper in-between. The width and length of the board are constant.

Figure 9:
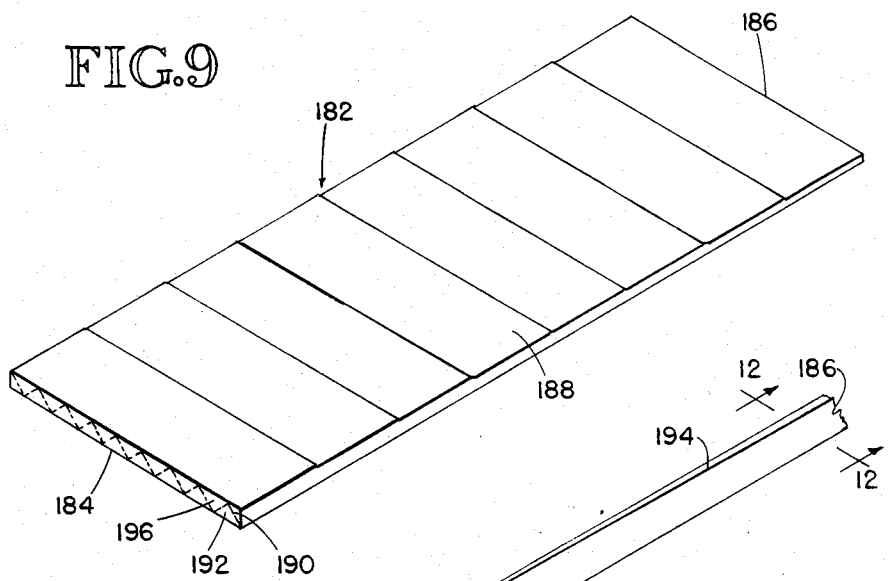
FIG. 9 is a schematic representation of a composite board for the production of tapered fillers in accordance with the present invention.
Figure 10:
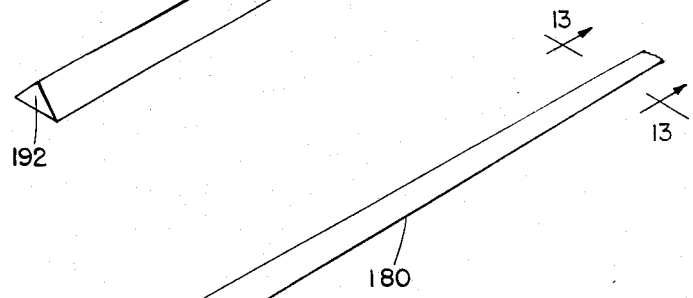
FIG. 10 is an enlarged isometric view of a waste strip produced from the board shown in FIG. 9.
Figure 13:
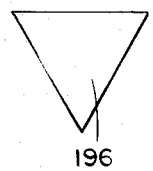
FIG. 13 is an enlarged sectional view taken along line 13—13 of the tapered strip shown in FIG. 11.

The modified composite board 182 is advanced through the strip-cutting machine 50 as previously described for the composite board 20. Note that the first piece 190 cut from the modified board 182 will be a waste piece, as was waste piece 89. However, the next piece 192 will also be a waste piece because the second end 186 (see FIG. 10) will have a truncated vertex 194. Upon reflection, it will become apparent that the next subsequent piece 196 will have a pointed vertex, as shown in FIGS. 11 and 13. All of the tapered strips in FIG. 9 which have their vertices pointing downward will have the cross-sectional shape shown in FIGS. 11 and 13 and thus will be usable for tapered fillers. All of the strips having vertices at first end 184, which point upward, will be waste pieces, because the vertices at the second end 186 will be truncated and not usable. The tapered strips shown in FIGS. 11 and 13 are difficult to roll-form in the conventional manner because of their non-constant cross-sectional shape. Therefore, the tapered strips are preferably used as tapered radius fillers directly, without any subsequent forming step.

Other variations of the invention described above are contemplated. For example, rather than rotating the board 20 about a transverse axis end-for-end to produce the desired strip cross-sectional shape, the blade 72 can be rotated about an axis parallel to the table surface 54 so that the blade position defines the opposite side of the equilateral triangle. Therefore, the invention is not to be limited by the above description, but is to be determined in scope by the claims which follow.

I claim:

1. A method for forming composite radius fillers of the type having a desired cross-sectional shape, comprising the steps of:

building an elongated rectangular board having two ends from a plurality of layers of composite material, wherein each layer has a plurality of elongated fibers substantially aligned so as to be substantially parallel and wherein substantially all of the fibers in the board define a fiber direction aligned with the board length;

separating elongated strips from the board in the fiber direction so that the strips have an intermediate cross-sectional shape which approximates the desired composite radius filler cross-sectional shape; and forming the elongated strips in a forming device to the desired cross-sectional shape.

2. The method of claim 1 wherein the separating step includes a step of cutting the elongated strips from the board in the fiber direction with a cutting device.

3. The method of claim 2 wherein the elongated strips are cut at an acute angle with respect to a bottom layer of the board.

4. The method of claim 3 wherein the cutting device is translated a predetermined distance transverse to the fiber direction and wherein the board is rotated end-for-end about an axis transverse to the fiber direction before subsequent separating steps so that the intermediate cross-sectional shape of the strips is triangular.

5. The method of claim 4 wherein the acute angle is approximately 60°, whereby the intermediate cross-sectional shape is approximately an equilateral triangle.

6. The method of claim 4 wherein the board has a thickness of approximately 0.25".

7. The method of claim 4 wherein the board building step includes using layers of composite materials having varying lengths and positioning the layers so that the board has a tapering thickness between the ends, whereby alternate elongated strips have correspondingly tapered, triangular cross sections.

8. The method of claim 1 wherein the layers include sections of composite tape having substantially unidirectional fibers pre-impregnated with a binding agent wherein each layer has a thickness of approximately 0.007" to 0.009".

9. The method of claim 1 wherein the board has a thickness of approximately 0.25".

10. The method of claim 1 wherein the board has a width of approximately 12".

11. Composite radius fillers for use in construction of composite structural joints, made by the process comprising the following steps:
building an elongated rectangular board having two ends from a plurality of layers of composite material, wherein each layer has a plurality of elongated fibers substantially aligned so as to be substantially parallel and wherein substantially all of the fibers in the board define a fiber direction aligned with the board length;

separating elongated strips from the board in the fiber direction so that the strips have an intermediate cross-sectional shape which approximates the desired composite radius filler cross-sectional shape; and forming the elongated strips in a forming device to the desired cross-sectional shape.

12. A method for forming composite radius fillers of the type having a desired cross-sectional shape, comprising the steps of:
building an elongated rectangular board having two ends from a plurality of layers of composite material, wherein each layer has a plurality of elongated fibers substantially aligned so as to be substantially parallel and wherein substantially all of the fibers in the board define a fiber direction aligned with the board length; and separating elongated strips from the board in the fiber direction so that the strips have an intermediate cross-sectional shape which approximates the desired composite radius filler cross-sectional shape.

13. The method of claim 12 wherein the separating step includes a step of cutting the elongated strips from the board in the fiber direction with a cutting device.

14. The method of claim 13 wherein the elongated strips are cut at an acute angle with respect to a bottom layer of the board.

15. The method of claim 14 wherein the cutting device is translated a predetermined distance transverse to the fiber direction and wherein the board is rotated end-for-end about an axis transverse to the fiber direction before subsequent separating steps so that the intermediate cross-sectional shape of the strips is triangular.

* * * * *